(No Model.)
W. S. MARTIN.
Horse Detaching Apparatus.
No. 233,530. Patented Oct. 19, 1880.
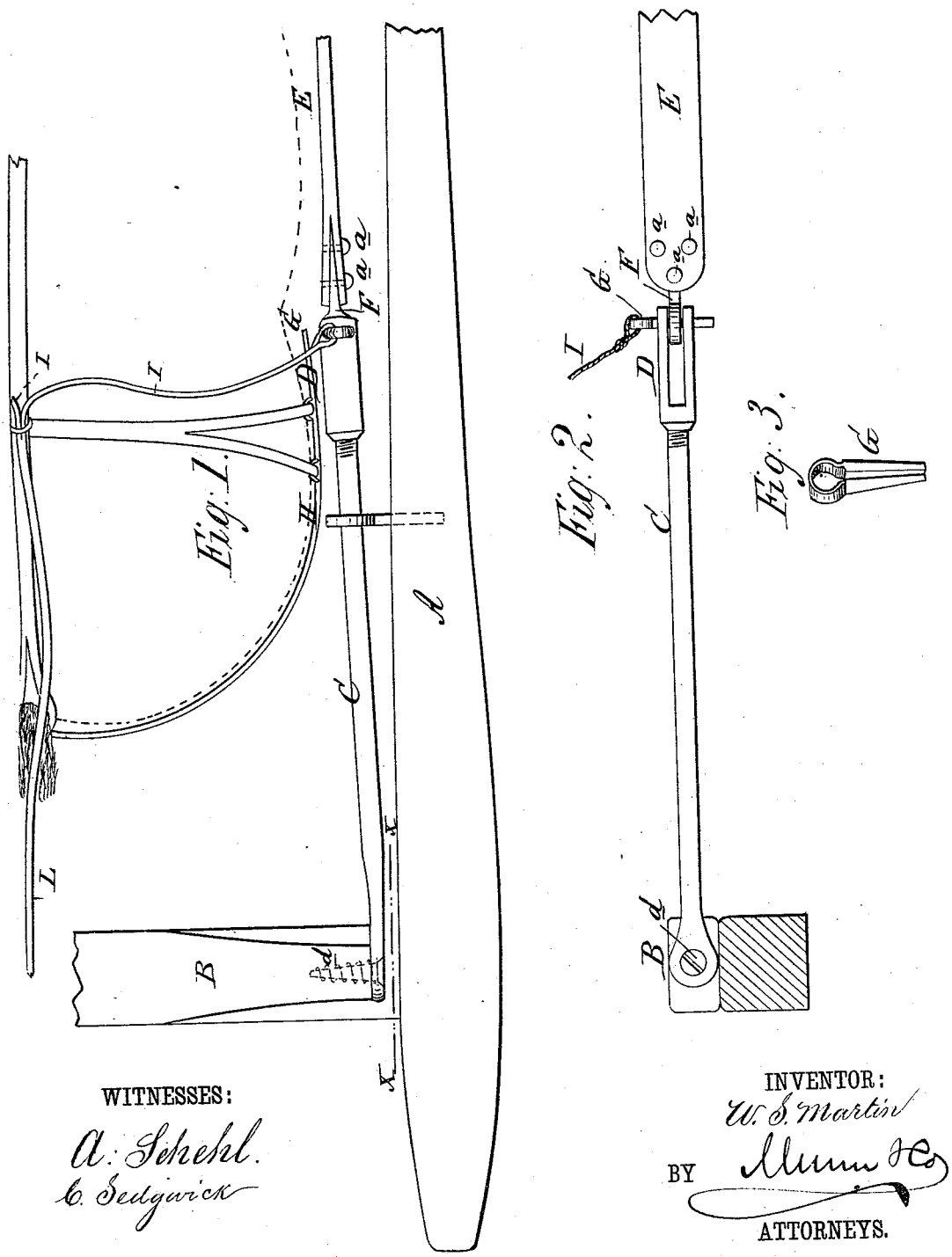

United States Patent Office.

WHITEFOORD S. MARTIN, OF MAYBINTON, SOUTH CAROLINA.

HORSE-DETACHING APPARATUS.

SPECIFICATION forming part of Letters Patent No. 233,530, dated October 19, 1880.

Application filed May 18, 1880. (No model.)

*To all whom it may concern:*

Be it known that I, WHITEFOORD S. MARTIN, of Maybinton, in the county of Newberry and State of South Carolina, have invented a new and Improved Horse-Detaching Apparatus, of which the following is a specification.

This invention relates to that class of devices that are designed for releasing a horse instantly from the vehicle to which he may be attached.

An iron rod is attached to each end of the whiffletree and extends forward a short distance alongside the shafts or thills. The short leather traces are attached to the front ends of these rods by means of keys or eyebolts, which may be withdrawn—for the purpose of releasing the horse from the vehicle—by means of cords or straps that pass through a ring on the crupper or back-strap of the harness, and extend back over the dasher of the vehicle, so as to be easily accessible to the driver.

In accompanying drawings, Figure 1 is a plan view, representing my improvement as practically applied, and Fig. 2 is a section on line *x x*, Fig. 1. Fig. 3 is a side view of one of the spring-keys.

Similar letters of reference indicate corresponding parts.

In the drawings, A represents the shaft, and B the single-tree, of the vehicle. C represents the wire portion of the trace, the rear end of which is secured by a screw or other device, *d*, in the end of the single-tree B. On the forward end of this wire section C of the trace is screwed an open link, D.

E is the leather and forward section of the trace, in the end of which is inserted a metal eye, F, which is held in place by rivets *a a* or other suitable fastening. Said eye F is inserted into the link D, and the spring-key G is passed through the two to hold the two parts together. The wire section C of the trace extends about half-way, meeting the leather section E at the flank of the horse.

H represents a screw-eye or leather or rubber loop inserted into or screwed to the shaft A, and supporting the wire section C of the trace, which passes through it.

Cords or straps I are attached to the eyes of keys G, and extend upward and pass through a ring, K, attached to the crupper-strap of the harness. In rear of said ring the straps I form one strap, L, which extends back to the driver's seat. By pulling the strap L the keys G may be drawn out, thereby disconnecting the traces from the iron rods C and allowing the horse to go free of the vehicle.

What I claim is—

The combination of the pull-strap L, having branches I, with the ring K on the crupper-strap, the keys G, the traces E, having eyes F, and the rods C, permanently attached to the vehicle, all as shown and described, for the purpose specified.

WHITEFOORD SMITH MARTIN.

Witnesses:
W. B. OXNER,
C. W. BYNUM.